United States Patent
Andersson et al.

(10) Patent No.: US 7,100,989 B2
(45) Date of Patent: Sep. 5, 2006

(54) COLLAPSIBLE SEAT CUSHION

(75) Inventors: Christer Andersson, Trollhättan (SE); Odd Jaegtnes, Lödöse (SE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/987,130

(22) Filed: Nov. 12, 2004

(65) Prior Publication Data
US 2006/0103214 A1 May 18, 2006

(51) Int. Cl.
*A47C 7/28* (2006.01)
*A47C 7/30* (2006.01)
*B60N 2/36* (2006.01)

(52) U.S. Cl. .......................... 297/378.13; 297/378.14; 297/452.49; 297/452.52

(58) Field of Classification Search ........... 297/452.49, 297/452.52, 378.13, 378.14; 5/249–251; 267/103, 180, 182
See application file for complete search history.

(56) References Cited

U.S. PATENT DOCUMENTS

| | | | |
|---|---|---|---|
| 4,377,279 A * | 3/1983 | Schulz et al. .................. 5/250 |
| 4,620,336 A | 11/1986 | Miller | |
| 4,654,905 A | 4/1987 | Miller | |
| 4,771,995 A * | 9/1988 | Wells et al. ..................... 5/250 |
| 5,052,064 A * | 10/1991 | Hagemeister et al. .......... 5/247 |
| 5,346,188 A * | 9/1994 | Rodgers et al. ............. 267/103 |
| 5,539,944 A | 7/1996 | Miller | |
| 5,622,357 A * | 4/1997 | Schulz et al. ............... 267/103 |
| 5,765,240 A * | 6/1998 | Workman ....................... 5/249 |
| 6,012,190 A * | 1/2000 | Rogers .......................... 5/250 |
| 6,032,307 A * | 3/2000 | Workman ....................... 5/249 |
| 6,616,239 B1 * | 9/2003 | Guillot ................... 297/452.52 |
| 6,736,459 B1 * | 5/2004 | Sturt ........................ 297/378.1 |
| 6,860,561 B1 * | 3/2005 | Takata ............... 297/378.14 X |
| 6,874,840 B1 * | 4/2005 | Neale ................ 297/378.13 X |

FOREIGN PATENT DOCUMENTS

| EP | 182944 A1 * | 6/1986 |
| EP | 0192890 A | 9/1986 |

* cited by examiner

*Primary Examiner*—Rodney B. White
*Assistant Examiner*—Stephen D'Adamo
(74) *Attorney, Agent, or Firm*—Brooks Kushman P.C.

(57) ABSTRACT

A collapsible cushion for integration into an automobile seat is provided. The collapsible cushion includes a first cushion plate and a second cushion plate with a plurality of springs interposed between the plates. The first plurality of springs is rotatably attached to both the first cushion plate and the second cushion plate such that each spring pivots when the collapsible seat cushion is collapsed. A seat suitable for inclusion in a automobile incorporates the collapsible cushion of the invention.

20 Claims, 4 Drawing Sheets

COLLAPSIBLE SEAT CUSHION

BACKGROUND OF THE INVENTION

1. Field of the Invention

The present invention relates to collapsible seat cushions, and in particular to collapsible seat cushions that are integrated into an automobile seat.

2. Background Art

As the number of smaller automobiles increases, there is a growing need to devise ways of increasing the storage capacity of such vehicles. For example, minivans of current design have relatively small cargo volume behind the last row of seats when all of the seats are in place. To enlarge this volume, the vehicle seats can be disconnected and removed. This type of seating system is disadvantageous because it is necessary to disassemble, i.e., disconnect the individual vehicle seats from their anchored positions in the vehicle floor, and to store the vehicle seats that have been removed outside the vehicle, and these seats must be re-attached when additional passenger seating is required. As a result, the vehicle can be adapted only by expending considerable time to adapt to changing needs regarding passenger capacity and cargo volume.

Some existing minivans include stowable seats which are the fold-and-tumble type and can sometimes be removed from the vehicle. Their seat backs collapse forward and then the entire seat assembly tips upward and forward 90 degrees and sits up against the backs of the front seats. This provides more cargo space, but the seat still takes up some fore-aft cargo room. Moreover, although collapsible seat designs such as this exist, this is an ever present desire to decrease the amount of space such seat occupies when the seat is collapsed.

Accordingly, it is desirable to provide an improved collapsible seat assembly in which cargo storage capacity is increased.

SUMMARY OF THE INVENTION

The present invention overcomes the problems encountered in the prior art by providing in one embodiment a collapsible seat cushion. The collapsible seat cushion of the invention includes a first cushion plate, a second cushion plate, and a first plurality of springs disposed between the first cushion plate and the second cushion plate. The first plurality of springs is rotatably attached to both the first cushion plate and the second cushion plate such that each spring pivots when the collapsible seat cushion is collapsed. Moreover, the first cushion plate and the second cushion plate are positionable at a first relative position and a second relative position. The first relative position defines a first average distance between the first and second cushion plates, and the second relative position defines a smaller second average distance between the first and second cushion plates.

In another embodiment of the invention, a seat which incorporates the collapsible cushion of the invention is provided. The collapsible seat of this embodiment includes a cushion section, a backrest, and a mounting bracket. In a variation of this embodiment, the backrest of the seat also includes a collapsible cushion section.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1:
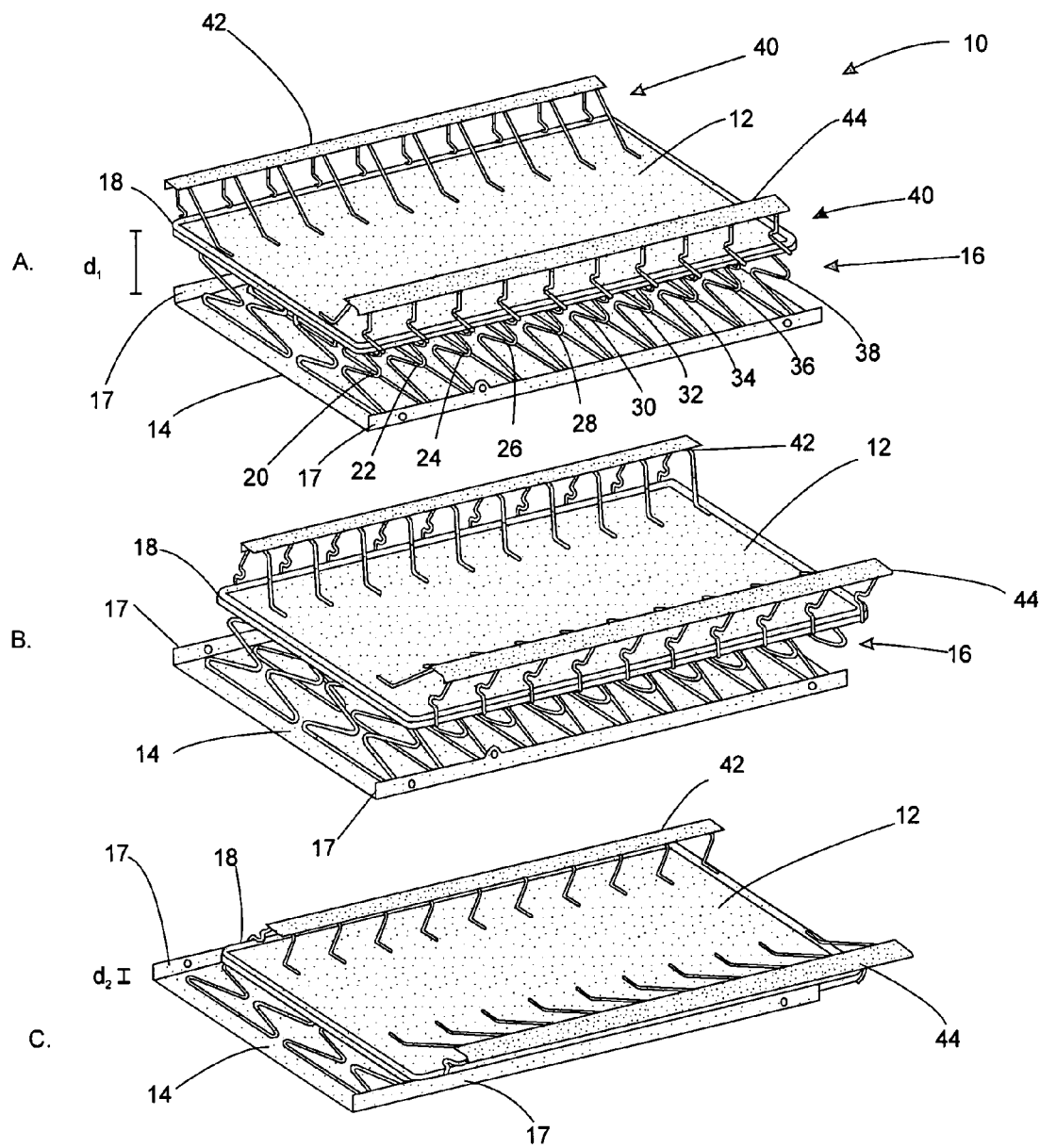
FIG. 1A is a perspective view of the collapsible seat cushion of the invention at the fully raised position.
FIG. 1B is a perspective view of the collapsible seat cushion of the invention at the half way down position.
FIG. 1C is a perspective view of the collapsible seat cushion of the invention at the fully folded position.

In one embodiment of the present invention, a collapsible seat cushion suitable for use in an automobile seat is provided. With reference to FIGS. 1A, 1B, and 1C, perspective views of the internal construction of the collapsible seat cushion of the invention is provided. It should be appreciated that the collapsible seat cushion will include the typical coverings used in seat applications. Such coverings include fabrics, leathers, vinyl, and the like. Collapsible cushion 10 comprises first cushion plate 12 and second cushion plate 14. First plurality of springs 16 are disposed between first cushion plate 12 and second cushion plate 14. In one variation, first cushion plate 12 will be somewhat flexible so as to at least partially conform to a person seated on collapsible cushion 10. Moreover, although FIG. 1 shows first cushion plate 12 and second cushion plate 14 as solid continuous sheets, discontinuous or weblike sheets may also be used. When first cushion plate 12 and second cushion plate 14 are at a first position as illustrated in FIG. 1A a first average distance $d_1$ between the first and second cushion plates is defined. This position is the fully raised position. FIGS. 1B and 1C provide views of collapsible cushion 10 in a halfway down position and in a fully folded position. When collapsible cushion 10 is in the fully folded position, first cushion plate 12 and second cushion plate 14 are separated by average distance $d_2$ which is less than $d_1$. Reference to an average distance for $d_1$ and $d_2$ is appropriate since first cushion plate 12 and second cushion plate 14 may not be perfectly flat or planar, and may not be perfectly parallel to each other. Each spring of the plurality of springs 16 is rotatably attached to both the first cushion plate and the second cushion plate. Although many springs are coiled, the present invention utilizes springs that are substantially planar. Planar springs are required since the collapsible seat cushion collapses by a folding motion in which the springs pivot in the same direction (clockwise or counterclockwise). Although the main mechanism for collapse is folding, some amount of compression may also be present to aid in reducing the size of collapsed cushion 10 when folded. In a variation of the invention, plurality of springs 16 are arranged into rows 20–38. Typically, each row includes two or more springs or spring sections. Arrangement of the springs into rows allows for efficiently packing of the springs and coordination of the pivoting of the spring during folding of collapsible cushion 10. In some variations, the first few rows at the front (i.e., at the end designed for a person's legs to go over) of collapsible cushion 10 are tilted slightly forward.

Still referring to FIGS. 1A, 1B, and 1C, it should also be appreciated that seat cushion 10 may include secondary contouring. In one variation, such secondary contouring is achieved by attachment of a second plurality of springs 40 to first cushion plate 12 and secondary plates 42, 44. In a similar fashion to first plurality of springs 16, each spring of second plurality of springs 40 is rotatably attached to first cushion plate 12 and one of secondary plates 42, 44. Again, a second plurality of springs 40 pivot when collapsible cushion 10 is brought to the fully folded position.

Figure 2:
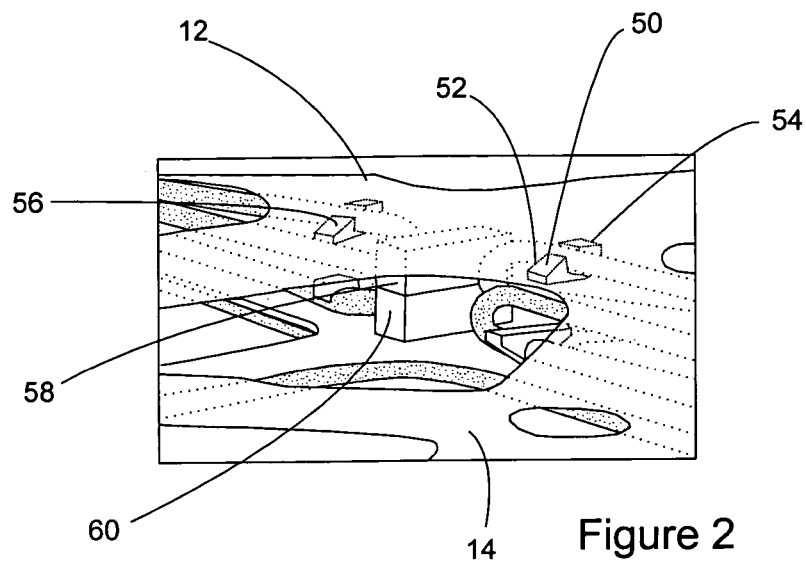

With reference to FIG. 2, a perspective view showing the attached plurality of springs 16 to first cushion plate 12 and second cushion plate 14 is provided. Braces 50 attach plurality of springs 16 to first cushion plate 12 and second cushion plate 14 such that each spring is able to pivot relative to first cushion plate 12 and second cushion plate 14. Such pivoting is possible because braces 50 are fixed to either first cushion plate 12 and second cushion plate 14 at ends 52, 54. Moreover, braces 50 have opening 56 through which a portion of a spring passes which affixes the spring to braces 50. Accordingly, each spring of plurality of springs 16 can pivot. Braces 50 may be attached to first cushion plate 12 and second cushion plate 14 by any method known to those skilled in the art. For example, braces 50 may snap into first cushion plate 12 or second cushion plate 14. Alternatively, braces 50 may be attached by heat staking. Also illustrated in FIG. 2 is the utilization of optional stops 58, 60 which limit the amount of collapse of collapsible cushion 10. Moreover, stops 58, 60 prevent springs from contacting each other and creating noise.

Figure 3:
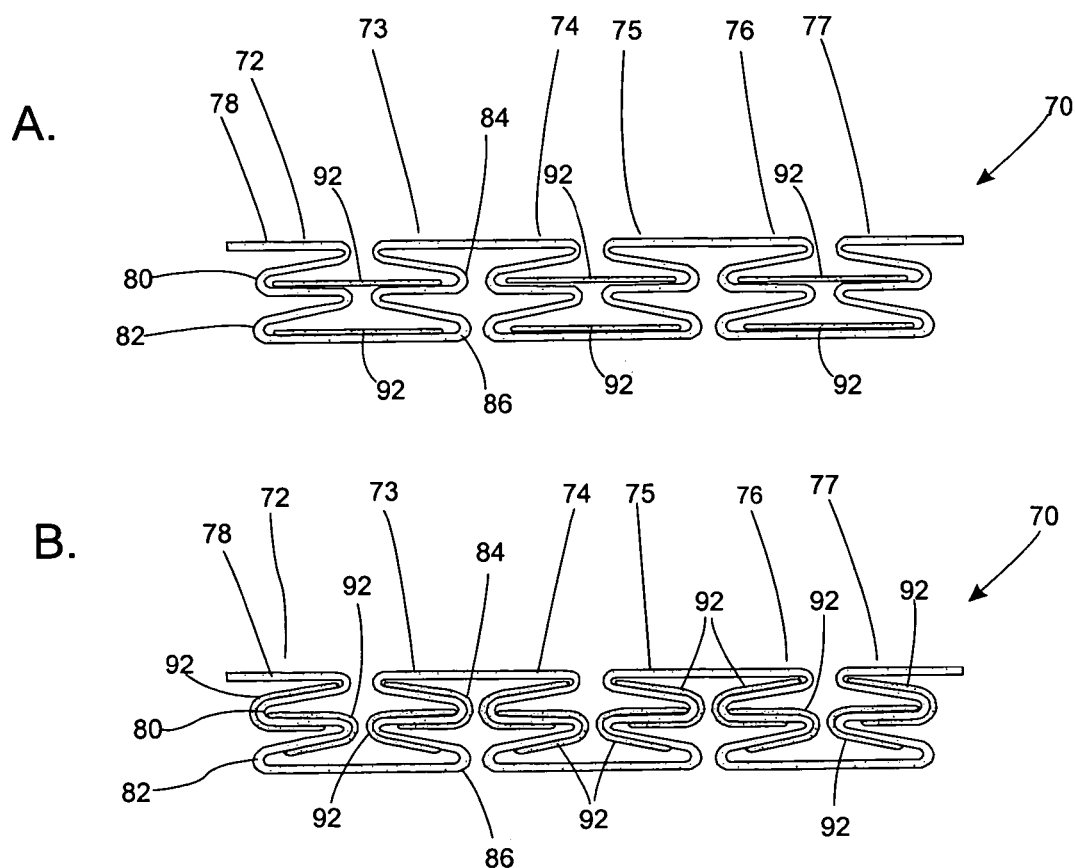
FIG. 3A is a front view of a row of springs as used in a variation of the present invention.
FIG. 3B is a front view of a row of springs as used in a variation of the present invention with an alternative placement of a sound absorbing material.

With reference to FIGS. 3A and 3B front views of a row of springs is provided. Row of springs 70 includes spring sections 72, 73, 74, 75, 76, 77. In a variation of the invention, spring sections 72, 73, 74, 75, 76, 77 are continuous and formed from metal wire 78 which is bent into a plurality of folds (bends). Each set of folds define a spring section. For example, the set of folds which includes folds 80, 82, 84, 86 define spring section 72. For a given row of springs 70, each of folds 62 are substantially coplanar. Alternatively, spring sections 72, 73, 74, 75, 76, 77 are separated and formed from distinct wires. In this alternative, spring sections 72, 73, 74, 75, 76, 77 are now springs 72, 73, 74, 75, 76, 77. This latter variation allows for wires of differing properties to be used for each spring. Moreover, even when a row is formed from a single wire, different rows can be made from wires of differing properties. These variations can be achieved by using differing wire diameter, a different number of spring units per row, a different number of spring arms, and different lengths of spring arms. For either variation, spring (or spring sections) 72, 73, 74, 75, 76, 77 include relatively few bends in order to avoid wire to wire contact resulting in noise. Typically, each spring or spring section will have from 2 to 10 bends (i.e., folds). In other variations, each spring or spring section will have from 3 to 6 bends (i.e., folds). Moreover, springs (or spring sections) 72, 73, 74, 75, 76, 77 are designed to deflect from a height of about 40 to 100 nun to a height of about 10 to 30 nun. In one particularly useful variation, the springs are designed to deflect from a height of about 50 mm to about 12 mm. The deflect that is useful in the present invention gives a very space efficient packing of the springs. FIGS. 3A and 3B also demonstrate the utilization of a sound absorbing material. In FIG. 3A, sound absorbing material 92 is interposed between one or more bends of the plurality of bends. In FIG. 3B, sound absorbing material 92 also covers one or more bends of the plurality of bends. Such a sound absorbing material is useful to further damper any sounds produced when spring sections 72, 73, 74, 75, 76, 77 are compressed due to contact between one or more arms of the springs.

Figure 4:
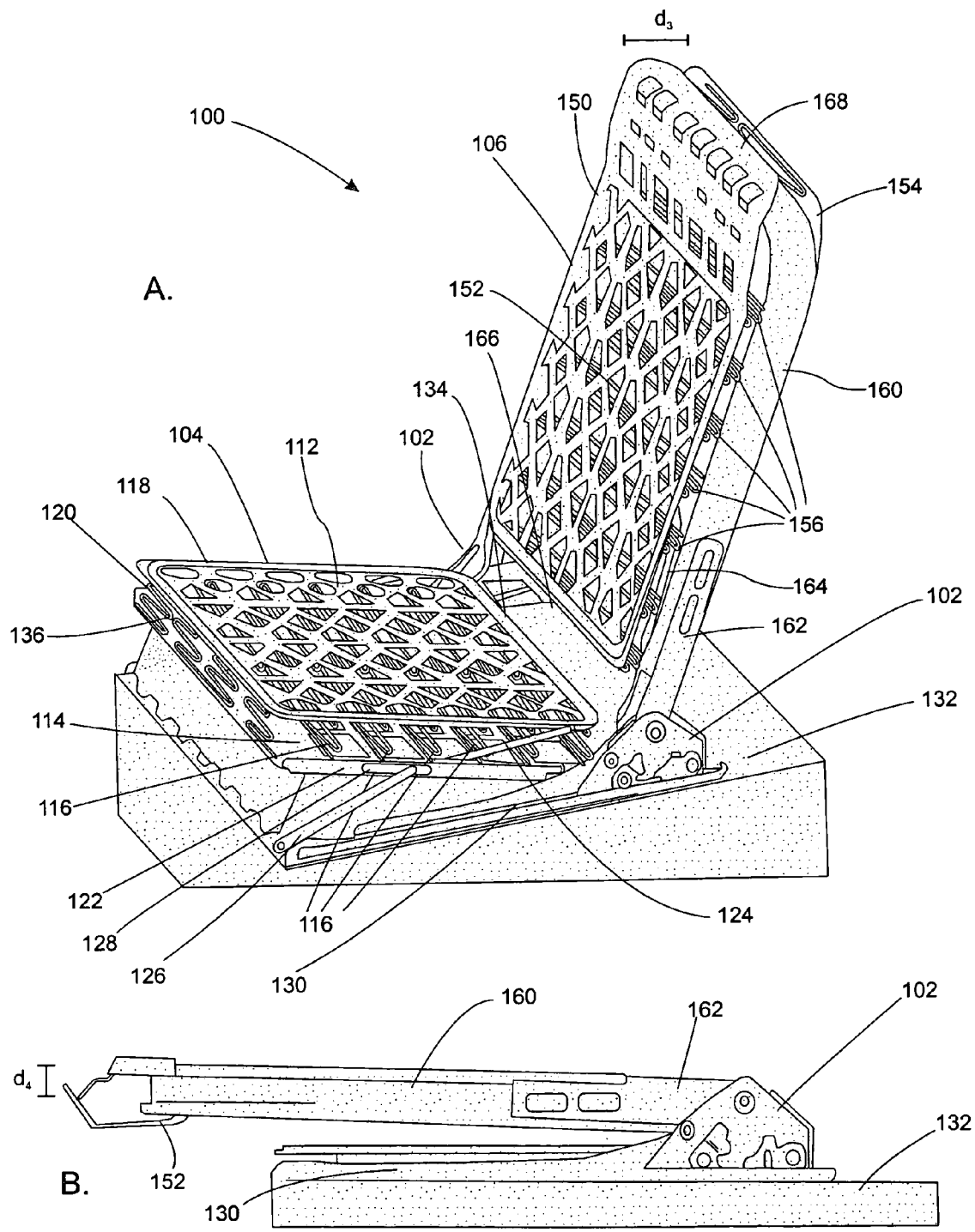
FIG. 4A is a perspective view of a seat incorporating the collapsible cushion of the invention in the fully raised position.
FIG. 4B is a perspective view of a seat incorporating the collapsible cushion of the invention in the fully folded position.

With reference to FIGS. 4A and 4B, views of a seat incorporating the collapsible cushion of the invention is provided. Seat 100 includes mounting bracket 102 to which collapsible cushion 104 and backrest 106 are attached. Both collapsible cushion 104 and backrest 106 are attached in a manner that allows each to pivot about mounting bracket 102. Mounting bracket 102 can be fixed to any of the underlying (vehicle) structure, cushion or backrest. Moreover, the various seats of the invention include any of the following combinations: collapsible cushion/collapsible backrest, collapsible cushion/non-collapsible backrest, and non-collapsible cushion/collapsible backrest. The construction of collapsible cushion 102 is the same as that set forth above. Specifically, collapsible cushion 104 includes a first cushion plate 112, second cushion plate 114, and first plurality of springs 116. Again, first plurality of springs 116 is disposed between first cushion plate 112 and second cushion plate 114 such that a first average distance between the first and second cushion plates when the first cushion plate and the second cushion plate are at a first relative position is defined. Similarly, a second average distance between the first and second cushion plates when the first cushion plate and the second cushion plate are at a second relative position. Each spring is attached and is rotatable as set forth above. In order to provide additional support and structural integrity, first cushion plate 112 may include support frame 118. Similarly, second cushion plate 114 includes support brackets 120, 122 to provide improved structural integrity. The junction of guides 124, 126 passes through groove 128. Guides 124, 126 provide stability by directing the relative movement of first cushion plate 112 and second cushion plate 114. Seat 100 includes base 130 that is adapted to be placed on supporting structure 132. Supporting structure 132 is typically the floor of the passenger compartment of an automobile. When folded as demonstrated in FIG. 4B first cushion plate 112 is moved towards cushion end 134. In a variation of the invention, first cushion plate 112 may be moved towards cushion end 136.

Still referring to FIGS. 4A and 4B, in a particularly useful embodiment of the present invention backrest 106 includes a section that is of the same general construction as the collapsible cushion set forth above. As set forth above, the present invention also includes seats that include collapsible cushion/collapsible backrest combinations, collapsible cushion/non-collapsible backrest combinations, and non-collapsible cushion/collapsible backrest combinations. Backrest 106 includes backrest cushion section 150. Backrest cushion section 150 includes first backrest plate 152, second backrest plate 154, and second plurality of springs 156 disposed between first backrest plate 152 and second backrest plate 154. First backrest plate 152 and second backrest plate 154 are positionable at a first relative position to define a third average distance $d_3$ between the first backrest plate 152 and second backrest plate 154. This first relative position is defined to be when backrest cushion section 150 is fully raised. Moreover, first backrest plate 152 and second backrest plate 154 are also positionable at a second relative position to define a fourth average distance between first backrest plate 152 and second backrest plate 154. Fourth average distance $d_4$ is less than third average distance $d_3$.

Fourth average distance $d_4$ corresponds to backrest cushion section 150 being fully folded. Again, each spring of the plurality of springs 156 are rotatably attached to both first backrest plate 152 and second backrest plate 154. Backrest 106 also includes backrest frame 160 which is attached to second backrest plate 154 and to bracket 162. The movement of first backrest plate 152 is guided by guide 164. When folded as demonstrated in FIG. 4B first backrest plate 152 is moved towards backrest end 166. In a variation of the invention, first backrest plate 152 may be moved towards backrest end 168.

Figure 5:
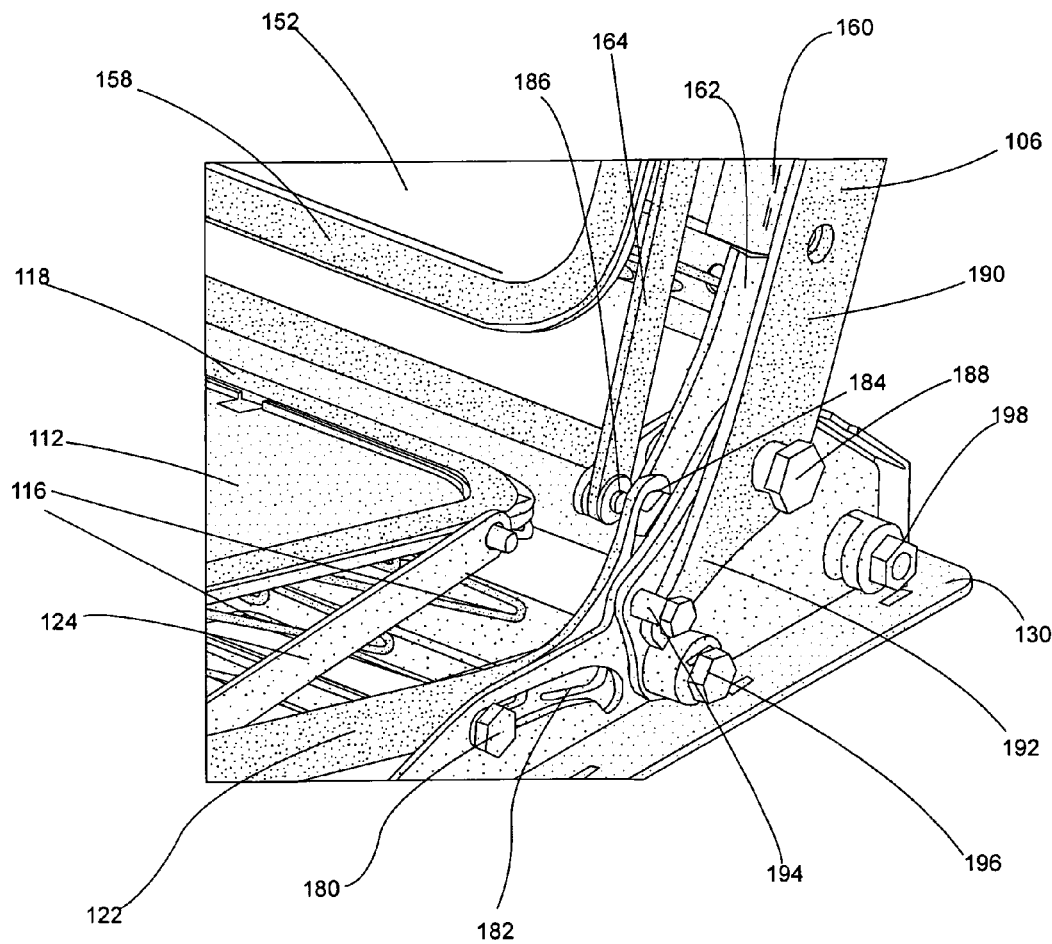
FIG. 5 is a perspective view of the attachment of a cushion and backrest to a mounting bracket.

With reference to FIG. 5, a detailed perspective view of the attachment of the cushion 104 and backrest 106 to mounting bracket 102 is provided. Support bracket 122 is design to be pulled back towards end 134 of seat 104. Bracket 122 includes guide bolt 180 which is limited to moving within slot 182. Support brackets 122 (and 120 not shown) are pulled back when backrest 106 is bent forward (i.e., pivoted toward cushion 104). This motion is accomplished by attachment of end 184 of support bracket 122 to pivoting connection 186. Pivot arm 186 is attached to bracket 162 which is part of backrest 106. When backrest 106 is pivoted forwards, pivot arm 186 pivots backward thereby pulling brackets 120, 122 back towards end 134. FIG. 5 also illustrates a mechanism for reproducibly positioning both cushion 104 and backrest 106 in the fully raised and fully folded positions. Backrest 106 pivots about pivot arm 188. Backrest 106 includes stop bracket 190 which has extension 192. Extension 192 contacts stop 194 thereby preventing backrest 106 from pivoting too far backwards. Lock arm 196 keeps backrest 106 in place until a user desires to fold the seat. Upon folding, lock arm 196 is bypassed. Typically lock arm 196 is movable and can be moved out of the way to allow extension 192 to proceed towards lock arm 198. Lock arm 198 allows for a predetermined reproducible positioning of cushion 104 and backrest 106 during folding.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A collapsible seat cushion for incorporation in a collapsible seat, the collapsible seat cushion comprising:
   a first cushion plate;
   a second cushion plate;
   a first plurality of springs disposed between the first cushion plate and the second cushion plate such that the first cushion plate and the second cushion plate are positionable at a first relative position and a second relative position, the first relative position defining a first average distance between the first and second cushion plates and the second relative position defining a second average distance between the first and second cushion plates, the second average distance being less than the first average distance, wherein each spring of the plurality of springs being rotatably attached to both the first cushion plate and the second cushion plate; and
   at least one support bracket attached to the second cushion plate, the at least one support bracket being moveable towards an end of the collapsible seat.

2. The collapsible seat cushion of claim 1 wherein at least one spring of the plurality of springs comprises a metal wire having a plurality of bends.

3. The collapsible seat cushion of claim 2 wherein the plurality of bends are substantially coplanar.

4. The collapsible seat cushion of claim 1 wherein a sound absorbing material is interposed between one or more bends of the plurality of bends.

5. The collapsible seat cushion of claim 1 further comprising one or more guides that prevent twisting between the first and second cushion plates.

6. The collapsible seat cushion of claim 1 further comprising one or more braces that attach the first plurality of springs to the first and second cushion plate, the braces allowing pivoting of the first plurality of springs.

7. The collapsible seat cushion of claim 1 wherein the plurality of springs are arranged in rows of springs.

8. The collapsible seat cushion of claim 7 wherein each row of springs comprises two or more springs.

9. The collapsible seat cushion of claim 7 wherein at least one row of the rows of springs comprises a wire having a plurality of bends defining two or more springs.

10. The collapsible seat cushion of claim 9 wherein the plurality of bends are substantially coplanar.

11. The collapsible seat cushion of claim 1 further comprising a second plurality of springs rotatably attached to both the first cushion plate.

12. A collapsible seat comprising:
    a mounting bracket;
    a backrest attached to the mounting bracket, the backrest pivotable about the mounting bracket;
    a collapsible cushion pivotable about the mounting bracket, the collapsible cushion comprising:
    a) a first cushion plate;
    b) a second cushion plate;
    c) a first plurality of springs disposed between the first cushion plate and the second cushion plate such that the first cushion plate and the second cushion plate are positionable at a first relative position and a second relative position, the first relative position defining a first average distance between the first and second cushion plates and the second relative position defining a second average distance between the first and second cushion plates, the second average distance being less than the first average distance, wherein each spring of the plurality of springs being rotatably attached to both the first cushion plate and the second cushion plate; and
    d) at least one support bracket attached to the second cushion plate, the at least one support bracket being moveable towards an end of the collapsible seat.

13. The collapsible seat of claim 12 wherein at least one spring of the plurality of springs comprises a metal wire having a plurality of bends.

14. The collapsible seat of claim 13 wherein the plurality of bends are substantially coplanar.

15. The collapsible seat of claim 14 wherein the plurality of springs are arranged in rows of springs.

16. The collapsible seat of claim 15 wherein at least one row of the rows of springs comprises a wire having a plurality of bends defining two or more springs.

17. The collapsible seat of claim 12 wherein a sound absorbing material is interposed between one or more bends of the plurality of bends.

18. The collapsible seat of claim 12 further comprising one or more braces that attach the first plurality of springs to the first and second cushion plate, the braces allowing pivoting of the first plurality of springs.

19. The collapsible seat of claim 12 wherein the backrest comprises:
    a) a first backrest plate;

b) a second backrest plate;
c) a second plurality of springs disposed between the first backrest plate and the second backrest plate that define a third average distance between the first and second backrest plates when the first backrest plate and the second backrest plate are at a first relative position, and a fourth average distance between the first and second backrest plates when the first backrest plate and the second backrest plate are at a second relative position, each spring of the plurality of springs being rotatably attached to both the first backrest plate and the second backrest plate, wherein the fourth average distance is less than the third average distance.

20. A collapsible seat comprising:

a mounting bracket;

a cushion selected from the group consisting of a non-collapsible cushion or a collapsible cushion, the collapsible cushion comprising:

a) a first cushion plate;
b) a second cushion plate;
c) a first plurality of springs disposed between the first cushion plate and the second cushion plate that define a first average distance between the first and second cushion plates when the first cushion plate and the second cushion plate are at a first relative position, and a second average distance between the first and second cushion plates when the first cushion plate and the second cushion plate are at a second relative position, each spring of the plurality of springs being rotatably attached to both the first cushion plate and the second cushion plate, wherein the second average distance is less than the first average distance and wherein the collapsible cushion is attached to the mounting bracket, the collapsible cushion pivotable about the mounting bracket; and
d) at least one support bracket attached to the second cushion plate, the at least one support bracket being moveable towards an end of the collapsible seat; and a backrest selected from the group consisting of a non-collapsible backrest or a collapsible backrest, the collapsible backrest comprising:

a) a first backrest plate;
b) a second backrest plate;
c) a second plurality of springs disposed between the first backrest plate and the second backrest plate that define a third average distance between the first and second backrest plates when the first backrest plate and the second backrest plate are at a first relative position and a fourth average distance between the first and second backrest plates when the first backrest plate and the second backrest plate are at a second relative position, each spring of the plurality of springs being rotatably attached to both the first backrest plate and the second backrest plate, wherein the fourth average distance is less than the third average distance and wherein the backrest is attached to the mounting bracket, the backrest pivotable about the mounting bracket.

* * * * *